United States Patent [19]
Park

[11] Patent Number: 5,870,508
[45] Date of Patent: Feb. 9, 1999

[54] AUTOMICALLY ALIGNING IMAGE DATA IN AN IMAGE PROCESSING APPARATUS

[75] Inventor: Joo-Seung Park, Gumi, Rep. of Korea

[73] Assignee: SamSung Electronics Co., Ltd., Kyungki-do, Rep. of Korea

[21] Appl. No.: 719,680

[22] Filed: Sep. 26, 1996

[30] Foreign Application Priority Data

Sep. 26, 1995 [KR] Rep. of Korea .................. 1995 31933

[51] Int. Cl.$^6$ ....................................................... G09G 1/06
[52] U.S. Cl. ........................... 382/289; 382/290; 358/488
[58] Field of Search .................................... 358/488, 452, 358/474; 382/289, 290

[56] References Cited

U.S. PATENT DOCUMENTS

| | | | |
|---|---|---|---|
| 4,387,435 | 6/1983 | Arai et al. ................................. | 364/514 |
| 4,891,693 | 1/1990 | Bergquist .................................. | 358/75 |
| 4,953,230 | 8/1990 | Kurose ...................................... | 382/46 |
| 5,027,227 | 6/1991 | Kita .......................................... | 358/488 |
| 5,093,653 | 3/1992 | Ikehira ...................................... | 370/727 |
| 5,181,260 | 1/1993 | Kurosu et al. ............................ | 382/46 |
| 5,191,438 | 3/1993 | Katsurada et al. ....................... | 358/426 |
| 5,289,262 | 2/1994 | McConnell ............................... | 356/375 |
| 5,311,607 | 5/1994 | Crosby ...................................... | 382/46 |
| 5,355,420 | 10/1994 | Bloomberg et al. ...................... | 382/46 |
| 5,373,371 | 12/1994 | Mashui ..................................... | 358/444 |
| 5,384,621 | 1/1995 | Hatch et al. .............................. | 355/204 |
| 5,410,417 | 4/1995 | Kuznicki et al. ........................ | 358/426 |
| 5,506,918 | 4/1996 | Ishitani .................................... | 382/289 |
| 5,528,387 | 6/1996 | Kelly et al. .............................. | 358/488 |

FOREIGN PATENT DOCUMENTS

| | | |
|---|---|---|
| 0441535 A2 | 8/1991 | European Pat. Off. . |
| 0552007 A2 | 7/1993 | European Pat. Off. . |
| WO 95/12271 | 5/1995 | WIPO . |

*Primary Examiner*—David K. Moore
*Assistant Examiner*—Stephen Brinich
*Attorney, Agent, or Firm*—Robert E. Bushnell, Esq.

[57] ABSTRACT

An automatic image data aligning technique for an image processing apparatus, such as a facsimile machine including the steps of assigning coordinates corresponding to horizontal and vertical lines of the document to be sent as the document is scanned with a laser beam, reading out a fiducial coordinate value of the horizontal line in the document, and computing and storing the respective compensatory coordinate values of the image data's horizontal lines; reading out a fiducial coordinate value of the image data's vertical line and computing and storing the compensatory coordinate values of the image data's vertical line; and aligning the image data's coordinates by using the respective compensatory coordinate values of the horizontal and vertical lines.

12 Claims, 3 Drawing Sheets

AUTOMICALLY ALIGNING IMAGE DATA IN AN IMAGE PROCESSING APPARATUS

CLAIM OF PRIORITY

This application makes reference to, incorporates the same herein, and claims all benefits accruing under 35 U.S.C. §119 from an application for AUTOMTIC IMAGE DATA ALIGING METHOD OF FACSIMILE UNIT earlier filed in the Korean Industrial Property Office on 26 Sep., 1995 and there duly assigned Serial No. 31933/1995.

BACKGROUND OF THE INVENTION

1. Field of the Invention

The present invention relates to automatically aligning image data in an image processing apparatus, such as a facsimile machine. More particularly, it relates to automatically aligning image data in an image processing apparatus, such as a facsimile machine that may be reproduced askew on paper because the document to be sent is conveyed to a readout device at a slant by a feeding roller when the document is scanned by a laser light source for document transmission or reproduction.

2. Description of the Related Art

According to a facsimile technique that has been used for years for the rapid transmission of documents, the document that is on the document-to-be-sent position is conveyed by a feeding roller and scanned by a laser light source from a laser scanner. The document passes through a readout device, communication information system (CIS) or charge coupled device (CCD) so that image data to which the contents of the document are converted is read out. When the feeding roller fails to convey the document to the readout device in a straight line, however, the image data is transferred to plain paper at a slant to cause poor reproduction quality and deterioration to the quality of a facsimile machine.

Exemplary efforts representation of contemporary practice with image processing apparatus having techniques for automatically aligning image data include: U.S. Pat. No. 4,387,435 to Arai et al. entitled Picture Printing Device, U.S. Pat. No. 4,953,230 to Kurose entitled Document Image Processing System, U.S. Pat. No. 5,027,227 to Kita entitled Image Rotating Device, U.S. Pat. No. 5,093,653 to Ikehira entitled Image Processing System Having Skew Correcting Means, U.S. Pat. No. 5,181,260 to Kurosu et al. entitled Method For Determining The Amount Of Skew Of Image, Method For Correcting The Same, And Image Data Processing System, U.S. Pat. No. 5,191,438 to Katsurada et al. entitled Facsimile Device With Skew Correction And Text Line Directions Detection, U.S. Pat. No. 5,311,607 to Crosby entitled Facsimile Machine For Printing Documents All With Corresponding Edges Aligned But Without Requiring Scanning, U.S. Pat. No. 5,355,420 to Bloomberg et al. entitled Method And Apparatus For Identification Of Document Skew, U.S. Pat. No. 5,373,371 to Masui entitled Image Processing apparatus, U.S. Pat. No. 5,384,621 to Hatchet al. entitled Document Detection Apparatus, U.S. Pat. No. 5,410,417 to Kuznicki et al. entitled Method And Apparatus For Correcting An Angle Of An Optical Image For Improving The Efficiency Of Facsimile Encoding Of The Image, U.S. Pat. No. 5,506,918 to Ishitani entitled Document Skew Detection/Control System For Printed Document Images Containing A Mixture Of Pure Text Lines And Non-Text Portions, U.S. Pat. No. 5,528,387 to Kelly et al. entitled Electronic Image Registration for A Scanner.

SUMMARY OF THE INVENTION

It is an object of the present invention to provide a technique for automatically aligning image data of the document to be sent through an image processing apparatus, such as a facsimile machine that may be formed askew on paper because the document is conveyed to a readout device by a feeding roller at a slant.

It is another object of the present invention to provide an automatic image data aligning technique for an image processing apparatus, such as a facsimile machine that can compensate for misalignment of image data by detecting a degree to which the document to be sent deviates from the correct position.

In order to realize the above objects, the present invention provides an automatic image data aligning technique for an image processing apparatus, such as a facsimile machine comprising the steps of assigning and storing two-dimensional coordinates of image data of the document to be processed as the document is scanned with a laser beam; reading out a coordinate value of the scanned image data's horizontal line and computing a compensatory coordinate value of the horizontal line; reading out a coordinate value of the scanned image data's vertical line and computing a compensatory coordinate value of the vertical line; and finding a difference between the respective horizontal and vertical lines' coordinate values and their compensatory coordinate values and outputting an image-formed product.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention is now described in detail with reference to the accompanying drawings.

Figure 1:
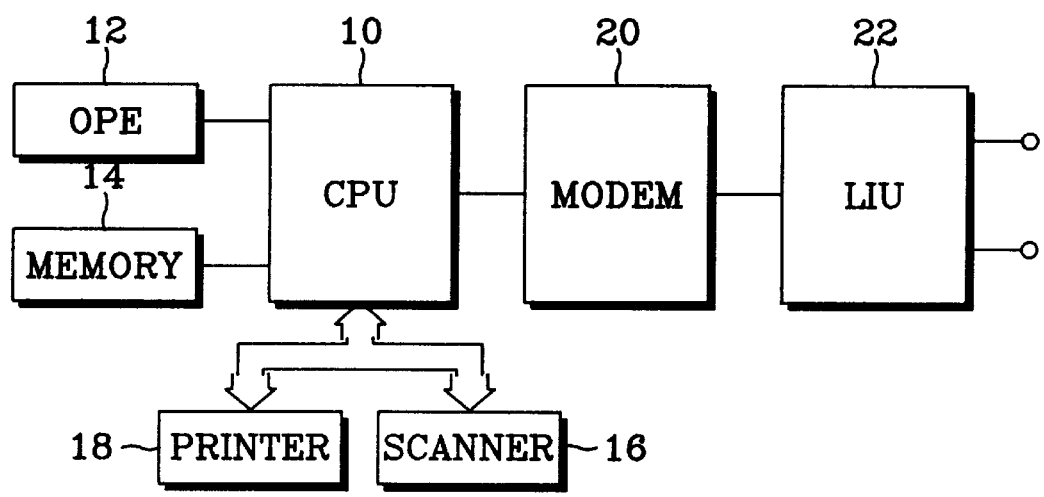
FIG. 1 is a block diagram of a facsimile machine in accordance with the present invention.

FIG. 1 is a block diagram of a facsimile machine in accordance with the present invention.

Central processing unit (CPU) 10 controls the overall operation of a facsimile machine according to a predetermined program, and detects misalignment of image data of the document with scanned fiducial coordinates to compensate for misalignment of image data. Memory 14 stores a program for compensating for misalignment of image data, and fiducial coordinate values for detecting the deviation of a document be sent. The memory 14 also temporarily stores data produced during the execution of programs. Operating panel (OPE) 12 has keys for inputting a plurality of function keys and digit keys, and serves to apply key data generated by the key input to the CPU 10 and to display the operating condition under the control of the CPU 10. Scanner 16 including a feeding roller for conveying the document, scans the document put on the document-to-be-sent position as the feeding roller rotates, and converts the information of the document into binary data, and supplies the data to the CPU 10. Modulator demodulator (modem) 20 converts the output data into an analog signal, and converts the input analog signal into a digital signal under the control of the CPU 10.

Line interface unit (LIU) 22, which is operated under the control of the CPU 10, forms a communication loop with a telephone line and interconnects the output signal of the modem 20 and the output signal of the telephone line. Printing unit 18 prints a record of image data on paper under the control of the CPU 10.

Figure 2:
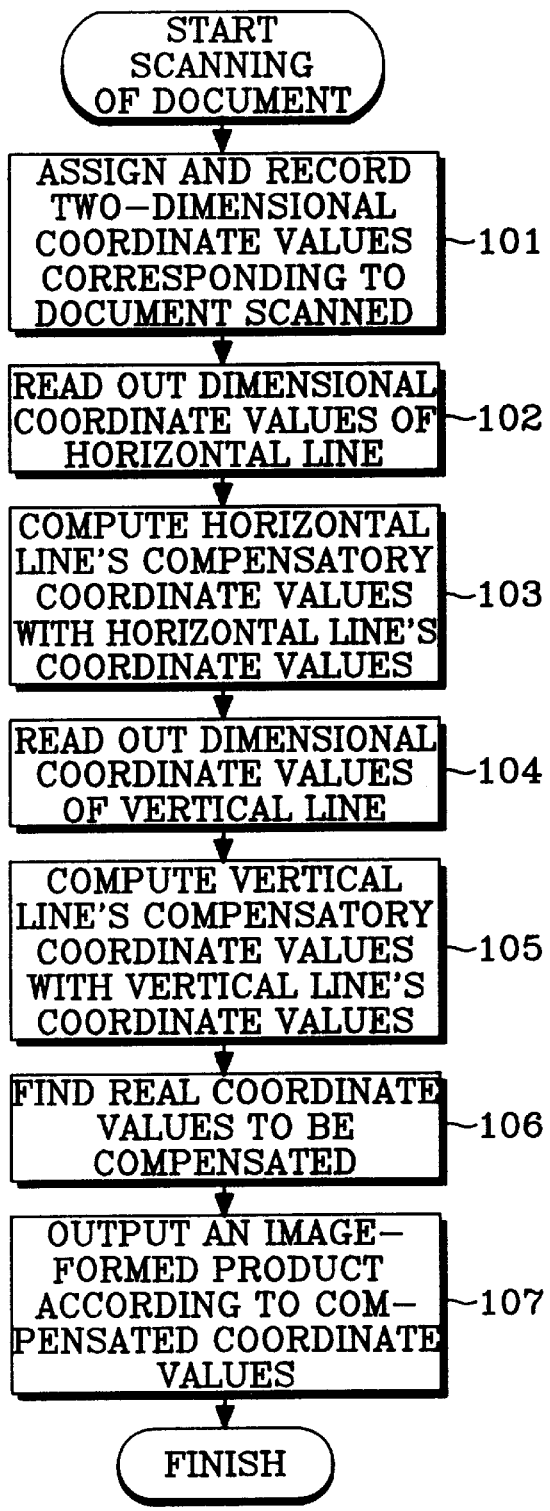
FIG. 2 depicts the steps in the compensation for misalignment of image data in accordance with a preferred embodiment of the present invention.

FIG. 2 depicts the steps in the compensation for misalignment of image data in accordance with a preferred embodiment of the present invention.

The compensation for misalignment of image data includes the steps of reading out a fiducial coordinate value of a horizontal line in the document to be sent as the document is scanned with a laser beam, and computing and storing each compensatory coordinate value of the image data's horizontal lines; reading out a fiducial coordinate value of the image data's vertical line, and computing and storing each compensatory coordinate value of the image data's vertical lines; and aligning the image data's coordinates by using each compensatory coordinate value of the horizontal and vertical lines.

Figure 3A:
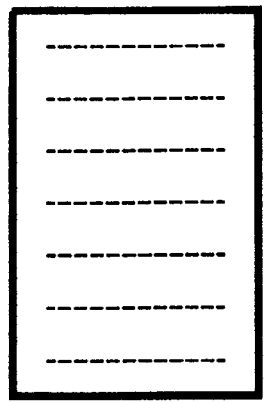
FIG. 3A shows the document transmitted in a normal condition.
Figure 3B:
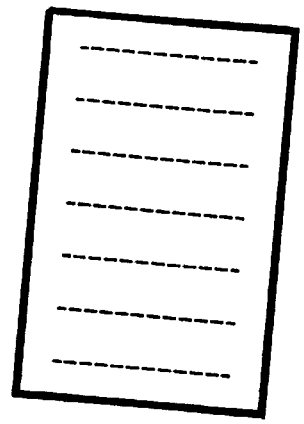
FIG. 3B shows the document transmitted aslant.

FIG. 3A depicts the document transmitted in a normal condition and FIG. 3B depicts the document that fails to be transmitted in a straight line.

Figure 4:
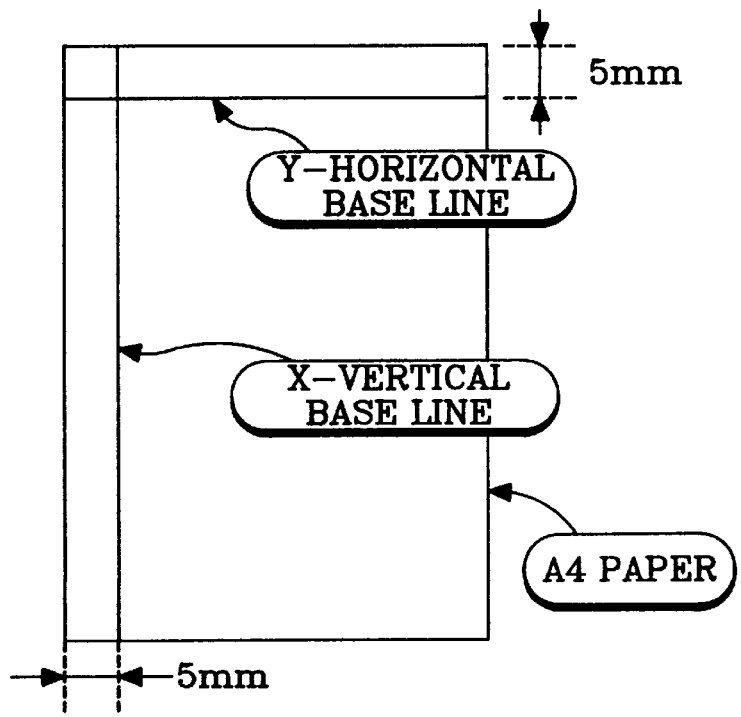
FIG. 4 depicts the vertical and horizontal base lines of the document for alignment of image data.

FIG. 4 depicts the vertical and horizontal base lines of the document for alignment of image data.

Referring now to FIGS. 1 to 4, a preferred embodiment of the present invention is described below.

Alignment of the image data of the document that fails to be conveyed to a readout device in a straight line demands vertical and horizontal base lines on a fixed position of the document, as shown in FIG. 4.

For example, a horizontal base line for compensating for Y axis' coordinates and a vertical base line for compensating for X axis' coordinates are 5 mm from the top of the document and 5 mm from the left of the document, respectively. The memory 14 stores each coordinate value of the vertical and horizontal base lines of the document that is transmitted in a normal condition.

Once the scanning starts, the CPU 10 scans (11) the document to be sent, and assigns coordinate values corresponding to the horizontal and vertical lines of the document. The CPU 10 reads out (12) the respective coordinate values of the horizontal lines of the document in serial order, and computes (13) each compensatory coordinate value $\Delta Y(j)$ of horizontal lines with the coordinate values of the horizontal lines that are read out in serial order by the following equation 1 and stores it in the memory 14.

$$\Delta Y(j) = j \times \frac{Yn - Y1}{n} \quad (1)$$

The reference letters appeared in the equation 1 designate the following: j variable of horizontal lines' coordinates; and n maximum number of pixels of horizontal lines by paper size (n equals 1728 in A4 paper).

When the size of the paper is A4, if a horizontal value Y1 of a first pixel equals 19 and a horizontal value Yn of an nth pixel equals 30, the horizontal lines' compensatory coordinate values $\Delta Y(1)$, $\Delta Y(500)$, $\Delta Y(1000)$ and $\Delta Y(1728)$ equal 1, 3, 10 and 11, respectively. The CPU 10 computes each compensatory coordinate value of the 1728 pixels' horizontal lines and stores it in the memory 14.

The CPU 10 reads out (104) the respective coordinate values of the vertical lines of the document scanned by a scanner in serial order, and computes (105) each compensatory coordinate value $\Delta X(i)$ of vertical lines with the coordinate values of the vertical lines that are read out in serial order by the following equation 2 and stores it in the memory 14.

$$\Delta X(i) = i \times \frac{Xm - X1}{m} \quad (2)$$

The reference letters appeared in the equation 2 designate the following: i variable of vertical lines' coordinates; and m maximum number of pixels of vertical lines by paper size (m equals 1143 in A4 paper).

The CPU reads out (106) each fiducial coordinate value of the horizontal and vertical lines stored in the memory 14, and finds a difference between the fiducial and compensatory coordinate values to compute a real coordinate value to be compensated. Initial coordinates $P\{X(i), Y(j)\}$ are compensated by coordinates $P\{X(i)-\Delta X(i), Y(j)-\Delta Y(j)\}$. The CPU 10 produces (107) image data aligned with each compensated coordinate value of the pixels and allows the same to be printed as an image-formed product.

The present invention enables automatic alignment of image data on paper, even though the document deviates from the correct position and can straighten the image data position thereby ensuring finer reproduction quality of image data.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An automatic image data aligning method for an image processing apparatus comprising the steps of:

assigning coordinates corresponding to horizontal and vertical lines of a document to be processed as the document is scanned with a laser beam, reading out a fiducial coordinate value of the horizontal line in the document, and computing and storing each compensatory coordinate value of the image data's horizontal lines, the computing being based on a number of horizontal line pixels for a predetermined document size;

reading out a fiducial coordinate value of the image data's vertical line and computing and storing each compensatory coordinate value of the image data's vertical lines, the computing being based on a number of vertical line pixels for the predetermined document size; and aligning the image data's coordinates by using each compensatory coordinate value of the horizontal and vertical lines.

2. An automatic image data aligning method for an image processing apparatus comprising the steps of:

assigning and storing two-dimensional coordinates of image data of a document to be processed as the document is scanned with a laser beam;

reading out a coordinate value of the scanned image data's horizontal line and computing a compensatory coordinate value of the horizontal line, the computing being based on a number of horizontal line pixels for a predetermined document size;

reading out a coordinate value of the scanned image data's vertical line and computing a compensatory coordinate value of the vertical line, the computing being based on a number of vertical line pixels for the predetermined document size; and finding a difference between the respective horizontal and vertical lines' coordinate values and their compensatory coordinate values and outputting an image-formed product.

3. An automatic image data aligning apparatus for an image processing apparatus comprising:

a means for assigning coordinates corresponding to horizontal and vertical lines of a document to be processed as the document is scanned with a laser beam, reading out a fiducial coordinate value of the horizontal line in the document, and computing and storing each compensatory coordinate value of the image data's horizontal lines, the computing being based on a number of horizontal line pixels for a predetermined document size;

a means for reading out a fiducial coordinate value of the image data's vertical line and computing and storing each compensatory coordinate value of the image data's vertical lines, the computing being based on a number of vertical line pixels for the predetermined document size; and a means for aligning the image data's coordinates by using each compensatory coordinate value of the horizontal and vertical lines.

4. An automatic image data aligning apparatus for an image processing apparatus comprising:

a means for assigning and storing two-dimensional coordinates of image data of a document to be processed as the document is scanned with a laser beam;

a means for reading out a coordinate value of the scanned image data's horizontal line and computing a compensatory coordinate value of the horizontal line, the computing being based on a number of horizontal line pixels for a predetermined document size;

a means for reading out a coordinate value of the scanned image data's vertical line and computing a compensatory coordinate value of the vertical line, the computing being based on a number of vertical line pixels for the predetermined document size; and a means for finding a difference between the respective horizontal and vertical lines' coordinate values and their compensatory coordinate values and outputting an image-formed product.

5. An automatic image data aligning method for an image processing apparatus comprising the steps of:

assigning coordinates corresponding to horizontal and vertical lines of a document to be processed as the document is scanned with a laser beam, reading out a fiducial coordinate value of the horizontal line in the document, and computing and storing each compensatory coordinate value of the image data's horizontal lines;

reading out a fiducial coordinate value of the image data's vertical line and computing and storing each compensatory coordinate value of the image data's vertical lines; and aligning the image data's coordinates by using each compensatory coordinate value of the horizontal and vertical lines;

wherein the compensatory coordinate value $\Delta Y(j)$ of a horizontal line is calculated from the following equation:

$$\Delta Y(j) = j \times \frac{Y_n - Y_1}{n}$$

wherein j is a variable of the horizontal lines' coordinates and n is a maximum number of pixels of horizontal lines for a predetermined paper size.

6. An automatic image data aligning method for an image processing apparatus comprising the steps of:

assigning coordinates corresponding to horizontal and vertical lines of a document to be processed as the document is scanned with a laser beam, reading out a fiducial coordinate value of the horizontal line in the document, and computing and storing each compensatory coordinate value of the image data's horizontal lines;

reading out a fiducial coordinate value of the image data's vertical line and computing and storing each compensatory coordinate value of the image data's vertical lines; and aligning the image data's coordinates by using each compensatory coordinate value of the horizontal and vertical lines;

wherein the compensatory coordinates value $\Delta X(i)$ of a vertical line is calculated from the following equation:

$$\Delta X(i) = i \times \frac{X_m - X_1}{m}$$

wherein i is a variable of the vertical lines' coordinates and m is a maximum number of pixels of vertical line for a predetermined paper size.

7. An automatic image data aligning method for an image processing apparatus comprising the steps of:

assigning and storing two-dimensional coordinates of image data of a document to be processed as the document is scanned with a laser beam;

reading out a coordinate value of the scanned image data's horizontal line and computing a compensatory coordinate value of the horizontal line;

reading out a coordinate value of the scanned image data's vertical line and computing a compensatory coordinate value of the vertical line; and finding a difference between the respective horizontal and vertical lines' coordinate values and their compensatory coordinate values and outputting an image-formed product;

wherein the compensatory coordinate value $\Delta Y(j)$ of a horizontal line is calculated from the following equation:

$$\Delta Y(j) = j \times \frac{Y_n - Y_1}{n}$$

wherein j is a variable of the horizontal lines' coordinates and n is a maximum number of pixels of horizontal lines for a predetermined paper size.

8. An automatic image data aligning method for an image processing apparatus comprising the steps of:

assigning and storing two-dimensional coordinates of image data of a document to be processed as the document is scanned with a laser beam;

reading out a coordinate value of the scanned image data's horizontal line and computing a compensatory coordinate value of the horizontal line;

reading out a coordinate value of the scanned image data's vertical line and computing a compensatory coordinate value of the vertical line; and finding a difference between the respective horizontal and vertical lines' coordinate values and their compensatory coordinate values and outputting an image-formed product;

wherein the compensatory coordinates value $\Delta X(i)$ of a vertical line is calculated from the following equation:

$$\Delta X(i) = i \times \frac{X_m - X_1}{m}$$

wherein i is a variable of the vertical lines' coordinates and m is a maximum number of pixels of vertical lines for a predetermined paper size.

9. An automatic image data aligning apparatus for an image processing apparatus comprising:

a means for assigning coordinates corresponding to horizontal and vertical lines of a document to be processed as the document is scanned with a laser beam, reading out a fiducial coordinate value of the horizontal line in the document, and computing and storing each compensatory coordinate value of the image data's horizontal lines;

a means for reading out a fiducial coordinate value of the image data's vertical line and computing and storing each compensatory coordinate value of the image data's vertical lines; and a means for aligning the image data's coordinates by using each compensatory coordinate value of the horizontal and vertical lines;

wherein the compensatory coordinate value $\Delta Y(j)$ of a horizontal line is calculated from the following equation:

$$\Delta Y(j) = j \times \frac{Y_n - Y_1}{n}$$

wherein j is a variable of the horizontal lines' coordinates and n is a maximum number of pixels of horizontal lines for a predetermined paper size.

10. An automatic image data aligning apparatus for an image processing apparatus comprising:

a means for assigning coordinates corresponding to horizontal and vertical lines of a document to be processed as the document is scanned with a laser beam, reading out a fiducial coordinate value of the horizontal line in the document, and computing and storing each compensatory coordinate value of the image data's horizontal lines;

a means for reading out a fiducial coordinate value of the image data's vertical line and computing and storing each compensatory coordinate value of the image data's vertical lines; and a means for aligning the image data's coordinates by using each compensatory coordinate value of the horizontal and vertical lines;

wherein the compensatory coordinates value $\Delta X(i)$ of a vertical line is calculated from the following equation:

$$\Delta X(i) = i \times \frac{X_m - X_1}{m}$$

wherein i is a variable of the vertical lines' coordinates and m is a maximum number of pixels of vertical line for a predetermined paper size.

11. An automatic image data aligning apparatus for an image processing apparatus comprising:

a means for assigning and storing two-dimensional coordinates of image data of a document to be processed as the document is scanned with a laser beam;

a means for reading out a coordinate value of the scanned image data's horizontal line and computing a compensatory coordinate value of the horizontal line;

a means for reading out a coordinate value of the scanned image data's vertical line and computing a compensatory coordinate value of the vertical line; and a means for finding a difference between the respective horizontal and vertical lines' coordinate values and their compensatory coordinate values and outputting an image-formed product;

wherein the compensatory coordinate value $\Delta Y(j)$ of a horizontal line is calculated from the following equation:

$$\Delta Y(j) = j \times \frac{Y_n - Y_1}{n}$$

wherein j is a variable of the horizontal lines' coordinates and n is a maximum number of pixels of horizontal lines for a predetermined paper size.

12. An automatic image data aligning apparatus for an image processing apparatus comprising:

a means for assigning and storing two-dimensional coordinates of image data of a document to be processed as the document is scanned with a laser beam;

a means for reading out a coordinate value of the scanned image data's horizontal line and computing a compensatory coordinate value of the horizontal line;

a means for reading out a coordinate value of the scanned image data's vertical line and computing a compensatory coordinate value of the vertical line; and a means for finding a difference between the respective horizontal and vertical lines' coordinate values and their compensatory coordinate values and outputting an image-formed product;

wherein the compensatory coordinates value $\Delta X(i)$ of a vertical line is calculated from the following equation:

$$\Delta X(i) = i \times \frac{X_m - X_1}{m}$$

wherein i is a variable of the vertical lines' coordinates and m is a maximum number of pixels of vertical line for a predetermined paper size.

* * * * *